UNITED STATES PATENT OFFICE.

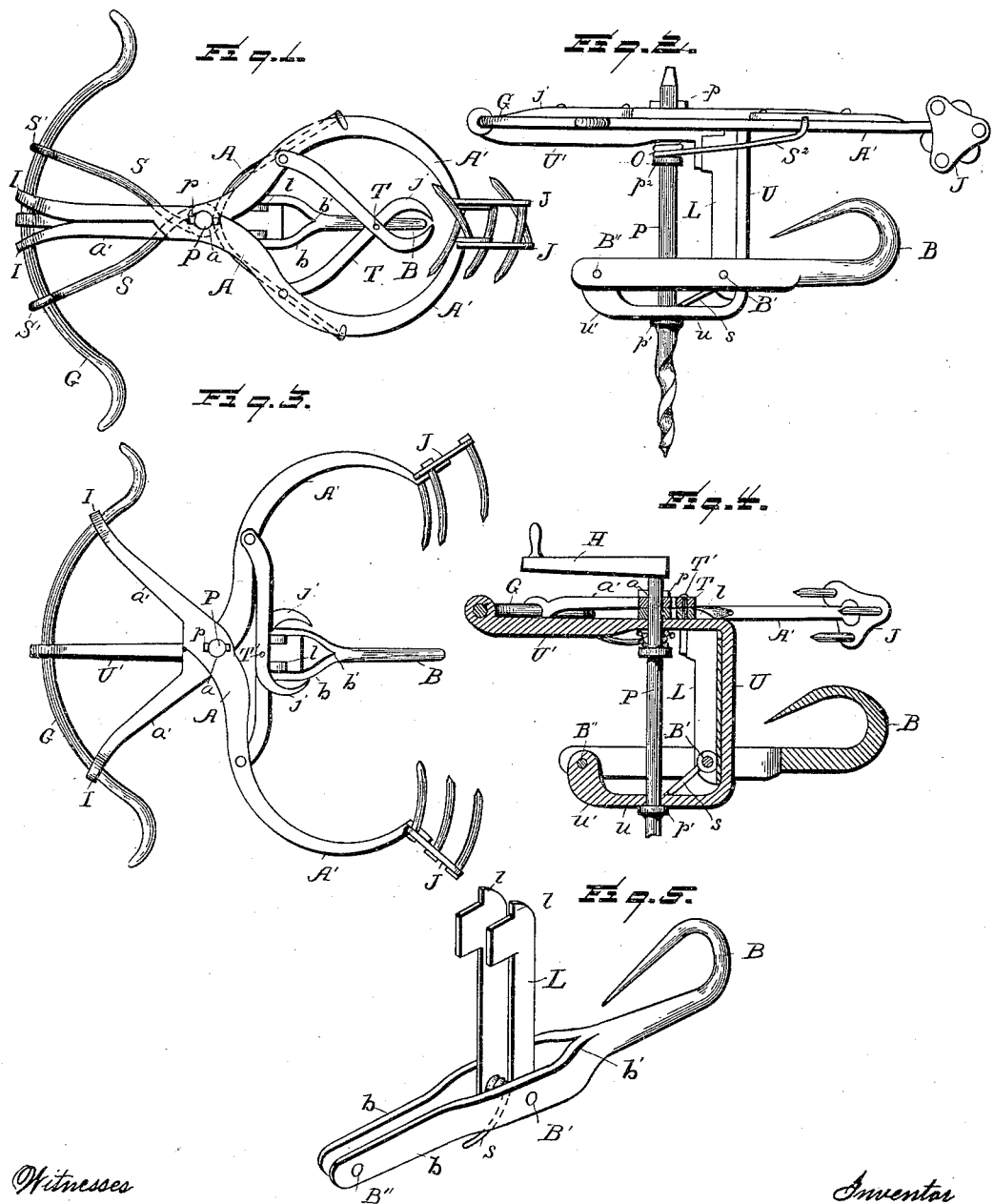

ZENAS B. KIDDER, OF HAYS CITY, KANSAS.

ANIMAL-TRAP.

SPECIFICATION forming part of Letters Patent No. 409,592, dated August 20, 1889.

Application filed April 17, 1889. Serial No. 307,604. (No model.)

*To all whom it may concern:*

Be it known that I, ZENAS B. KIDDER, a citizen of the United States, residing at Hays City, in the county of Ellis and State of Kansas, have invented a new and useful Animal-Trap, of which the following is a specification.

This invention relates to animal-traps of that class known as "victim-set;" and the object of the invention is to provide a trap that will be simple yet strong in its construction, easy to set without danger to the operator, capable of being easily and surely tripped by the animal, and adapted to hold him after he is caught in a firm and unyielding grasp, from which it is utterly impossible to escape without breaking the trap.

To this end my invention consists, broadly, of a pair of mainspring-operated jaws, a pair of secondary jaws pivoted thereto and to each other in the form of ice-tongs, a hook for holding the bait at the proper point, and a latch carried by said bait-hook and adapted to be tripped when the animal nibbles at the bait, all as will be more fully hereinafter described.

In the accompanying drawings, forming a part of this specification and wherein the same letters of reference are applied to similar parts throughout, Figure 1 is a plan view of my improved trap closed. Fig. 2 is a similar view of the same open. Fig. 3 is a side elevation thereof. Fig. 4 is a vertical longitudinal section, the trap being shown as open. Fig. 5 is a detail perspective of the bait-hook and tripping-latch detached.

Referring by letter to the drawings, P designates what is known to trappers as a "picket-pin," having a large thread at its lower end, by means of which it is adapted to be screwed into the ground or into a log or a supporting-base, if it is desired to use one. The upper end of this pin has a handle H, by means of which it can be turned to screw or unscrew it or carry the trap from place to place. With the exception of a transverse hole and fastening-pin $p$, as hereinafter described, and shoulders $p'$ and $p''$, the pin P does not differ materially from the ordinary picket-pins now in common use.

U is a substantially U-shaped frame, whose lower arm $u$ is journaled on the pin P and rests upon the shoulder $p'$ for its support, and which at its rear end is turned up at $u'$ for a purpose to appear further on. The upper arm U' of the frame U is somewhat longer, but is also journaled on the pin P. At its rear end it carries a guide-rod G, struck on the arc of a circle, of which the pin P is the center.

A A are the main arms of my trap, whose bodies are journaled at $a$, one upon the other, upon the pin P, extending thence rearwardly in straight arms $a'$ to their rear ends, where they are provided with eyes I, loosely embracing the guide-rod G, and also extending from said pivot forward in outwardly-curved arms A' to the main jaws J, which are mounted on their free front ends. The hereinbefore-mentioned pin $p$, through the picket-pin P, retains these arms A in proper position, and a pair of V-shaped springs S, one at either side of the U-frame, forces them normally inward to the position shown in Fig. 1 of the drawings. Each of these springs preferably comprises a loop S' at its rear end, loosely embracing the guide-rod G outside the eye I thereon, a coil O at its center embracing the picket-pin, and an elbow $S^2$ at its front end rigidly secured to the curved arm A' on that side of the trap. The two coils O O embrace the pin P between the shoulder $p''$ thereon and the upper arm U' of the frame, as shown in Fig. 2.

Pivoted to the curved arms A', near the pin P, are a pair of tongs T, which are pivotally connected at T', near their forward ends, and which carry integral jaws $j$ forward of said pivot T', said jaws standing normally at about the center of the circle formed by the curved arms A' when the trap is sprung, but extending across in front of the pin P in about a straight line when the trap is set.

L is a latch sliding within or (as in the present case) upon either side of the U-frame and pressed normally upward by a spring $s$. At its upper end the latch has one or more beveled teeth $l$, adapted to rise in front of the tong-arms T when opened to retain the trap in its set position.

B is the bait-hook, which stands normally a little below the plane in which the arms A and T are adapted to work, and whose body is forked at $b'$, and led thence rearwardly in two arms $b\ b$. These arms are pivoted at B' to the lower end of the latch L, and at B'', near their rear ends, to the upturned end $u'$ of the frame.

The parts being assembled and in proper working order, the operation of my improved trap is substantially as follows: The trap is set by inserting the thumbs in the curved arms A' in front of their pivotal points of connection with the tongs T, and the fingers behind the outer ends of the guide G, which are there curved slightly to the rear, as shown at g. The arms are then drawn back and thus opened, the tongs T at the same time assuming an almost straight line between their pivots. As the tongs are thus drawn rearwardly, they ride up the inclined front face of the latch l, and the spring s causes the latch to engage them. A piece of bait is firmly hooked or tied upon the hook B and the trap is ready for use. The trap is sprung by the animal. When he nibbles and pulls outwardly upon the bait attached to the hook B, the latter, from the downward curvature of its body, will draw down upon the latch L, whereby its teeth will be disengaged from the tongs T and the trap will spring into closed position, as seen in Fig. 1. In so closing, the jaws J come laterally against the sides of the animal's head and the teeth thereof enter it, and at the same time the smaller jaws j on the free ends of the tongs T come quickly forward and close into the nose of the animal, thus doubly grasping his head and securely holding him. The frame U, being pivoted on the picket-pin P, can turn laterally thereon, and such pin can therefore be easily screwed into the ground, the base, or a log, and the trap afterward set at any desired angle, so as to open in any desired direction. The trap can, of course, be made in a number of sizes for various animals, and its principle of operation will remain unchanged.

Having thus described my invention, I claim as its salient points—

1. In a trap, the main arms A, carrying jaws J, and the supplemental arms T, connected to said main arms and carrying jaws j, in combination with springs for forcing said arms into normally-closed position, the bait-hook B, and a latch connected to said bait-hook and adapted to hold said arms open, substantially as described.

2. In a trap, the picket-pin P, the outwardly-curved main arms A, pivoted thereon and carrying jaws J at their free ends, and the supplemental arms T, pivoted to said main arms forward of said pin P and pivoted to each other at T', near their front ends, said supplemental arms carrying inwardly-curved jaws j at their free ends, in combination with springs for forcing said arms into normally-closed position, a bait-hook, and a latch connected to said bait-hook and adapted to hold said arms open, substantially as described.

3. In a trap, the picket-pin P, a frame carried thereby, and a curved guide G, supported at the rear end of said frame, in combination with a pair of main arms A, centrally pivoted at a upon said pin, curved outwardly at A' forward of said pin and carrying jaws J at their front ends, said arms extending rearwardly from said pin and carrying eyes I at their ends loosely engaging said guide, springs for forcing said arms into normally-closed position, a bait-hook, and a latch connected to said bait-hook and adapted to hold said arms open, substantially as specified.

4. In a trap, the picket-pin P, having a shoulder $p''$ thereon, a frame mounted on said pin above said shoulder, and a curved guide G, supported at the rear end of said frame, in combination with a pair of main arms A, centrally pivoted at a upon said pin, curved outwardly at A' forward of said pin and carrying jaws J at their front ends, extending rearwardly in straight arms a' from said pin, and carrying eyes I at their rear ends loosely engaging said guide, springs S, having central coils O engaging said pin between said shoulder and frame, secured at their front ends to said curved arms A' and having loops S' at their rear ends loosely embracing said guide-rods G outside said eyes I, a bait-hook, and a latch connected to said bait-hook and adapted to hold said arms open, substantially as described.

5. In a trap, the picket-pin P, having the shoulder $p'$, the U-shaped frame U, journaled on said pin, with its lower arm u resting upon said shoulder and turned up at u' at its rear end, the bait-hook B, pivoted at its rear end to said turned-up end u' and extending forwardly therefrom, the latch L, pivoted to the center of said bait-hook, and the spring s, for pressing said latch into operative position, in combination with spring-operated arms carrying jaws and pivoted on said pin P, said latch being adapted to engage said arms to hold them in open position, substantially as described.

6. In a trap, the picket-pin P, having the shoulder $p'$, the U-shaped frame U, journaled on said pin, with its lower arm u resting upon said shoulder and turned up at u' at its rear end, the bait-hook B, pivoted at its rear end to said turned-up end u', the latch L, pivoted to the center of said bait-hook, and the spring s, for pressing said latch into operative position, in combination with the spring-operated main arms A, pivoted upon said pin, curved outwardly at A' and carrying main jaws J at their front ends, and the tongs T, pivoted to said curved arms A' at their rear ends and to each other at T', and carrying supplemental jaws j at their front ends, said tongs occupying an approximately-transverse line across the trap when it is open and adapted to be engaged by said latch to hold it set, substantially as and for the purpose hereinbefore described.

In testimony that I claim the foregoing as my own I have hereto affixed my signature in presence of two witnesses.

ZENAS B. KIDDER.

Witnesses:
JAMES H. REEDER,
B. T. ASHCRAFT.